United States Patent [19]

Kniewske et al.

[11] Patent Number: 5,278,304
[45] Date of Patent: Jan. 11, 1994

[54] WATER-SOLUBLE SULFOETHYL CELLULOSE ETHERS OF VERY HIGH SOLUTION QUALITY AND A PROCESS FOR THEIR PRODUCTION

[75] Inventors: Reinhard Kniewske, Fallingbostel; René Kiesewetter, Soltau-Ahlften; Klaus Szablikowski, Walsrode, all of Fed. Rep. of Germany

[73] Assignee: Bayer Aktiengesellschaft, Leverkusen, Fed. Rep. of Germany

[21] Appl. No.: 871,377

[22] Filed: Apr. 20, 1992

[30] Foreign Application Priority Data

Apr. 27, 1991 [DE] Fed. Rep. of Germany ....... 4113892

[51] Int. Cl.$^5$ ...................... C08B 11/10; A61K 7/00; A61K 9/08; D06B 9/00
[52] U.S. Cl. .......................... 536/90; 536/92; 536/99
[58] Field of Search .............. 536/90, 92, 99

[56] References Cited

U.S. PATENT DOCUMENTS

| | | | |
|---|---|---|---|
| 2,132,181 | 10/1938 | Neugebauer et al. | 536/92 |
| 2,580,352 | 12/1951 | Grassie | 536/92 |
| 2,591,748 | 4/1952 | Vaughan | 536/90 |
| 3,357,971 | 12/1967 | Klug | 536/44 |
| 4,358,587 | 11/1982 | Brandt et al. | 536/90 |
| 4,501,887 | 2/1985 | Kornrumpf et al. | 536/84 |
| 4,990,609 | 2/1991 | Herzog et al. | 536/92 |
| 5,001,232 | 3/1991 | Herzog et al. | 536/92 |
| 5,177,199 | 1/1993 | Kiesewetter et al. | 536/90 |
| 5,182,380 | 1/1993 | Breckwoldt et al. | 536/90 |

FOREIGN PATENT DOCUMENTS

| | | |
|---|---|---|
| 0319865 | 6/1989 | European Pat. Off. . |
| 0470444 | 2/1992 | European Pat. Off. . |
| 0487988 | 6/1992 | European Pat. Off. . |

*Primary Examiner*—Nathan M. Nutter
*Attorney, Agent, or Firm*—Sprung, Horn, Kramer & Woods

[57] ABSTRACT

The invention relates to water-soluble sulfoethyl cellulose ethers, more particularly methyl sulfoethyl cellulose ether (MSEC), of very high solution quality, to a process for its production and to the use of these products as thickeners, dispersants or binders.

3 Claims, No Drawings ns.
WATER-SOLUBLE SULFOETHYL CELLULOSE ETHERS OF VERY HIGH SOLUTION QUALITY AND A PROCESS FOR THEIR PRODUCTION This invention relates to water-soluble sulfoethyl cellulose ethers, more particularly methyl sulfoethyl cellulose ethers (MSEC), of very high solution quality, to a process for their production and to their use as thickeners, dispersants or binders.

The production of sulfoethyl cellulose derivatives is known per se (see K. Engelskirchen in Houben-Weyl's "Makromolekulare Stoffe", Vol. E 20/III, page 2082, edited by A. Barth and J. Falbe, Georg-Thieme-Verlag, Stuttgart/New York [1987]).

According to U.S. Pat. No. 2,132,181, sulfoethyl cellulose ethers (SEC) are produced in a kneader This process is carried out with very large excesses of lye which, on the one hand, leads to significant secondary reactions and, on the other hand, makes the production of these products extremely uneconomical. In addition, experience has shown that reactions carried out in a laboratory kneader involve extremely poor solution qualities, i.e. high fiber and gel contents.

According to SU 757 540, an SEC is produced in two stages, in the first of which an alkali cellulose is prepared by reaction of cellulose with sodium hydroxide. The cellulose thus activated is compressed before the actual etherification step. This requires special high-pressure tools which in turn make the compression step technically very complicated. Because the alkalization process takes place in the presence of air, the cellulose chain undergoes alkaline/oxidative degradation so that, ultimately, only low-viscosity etherification products can be obtained by this process.

JP 8 218 701 describes the production of SEC with stepwise addition of sodium 2-chloroethanesulfonate in an inert slurry medium. However, the low degree of substitution DS of 0.33 leads to a transmission of only 80% which is reflected in a high percentage content of non-dissolved particles.

CS 200 676 describes a process for the production of sulfoethyl cellulose ethers in dioxane, acetone, benzene, isopropanol or n-propanol. In this case, the etherification with sodium vinyl sulfonate takes place at 40° to 65° C. The degree of substitution DS is 0.3 to 0.7. There are no references either to the yield or to the solution quality of the sulfoethyl cellulose derivatives.

According to U.S. Pat. No. 2,580,352, sulfoethyl cellulose ethers are prepared by reaction of an alkaline polysaccharide suspension in inert organic solvents, such as for example dioxane, isopropanol, tertiary butanol, tetrahydrofuran, ethylene glycol, diethyl ether. The products mentioned in the Examples have degrees of substitution DS in regard to sulfoethyl of 0.175 to 1.03. The low-DS sulfoethyl cellulose ethers (DS=0.175 and 0.21) are only soluble in dilute lyes. The exact solution quality is not discussed.

T. Timell (Svensk. Papperstidn. 51,254 [1948]) describes the production of SEC having DS values of 0.07 to at most 0.42 by reaction of alkali cellulose with haloethane sulfonic acid sodium salts. The products having DS values of 0.3 to 0.4 are described as water-soluble. However, the quality of the solutions is not discussed.

According to E. A. Plisko et al. (Zh. Prikl. Khim. 36, 1994 [1963]), SEC can be produced in a kneader without a solvent or by the slurry method using inert organic solvents. On account of the alkaline/oxidative degradation which SEC produced in a kneader undergoes and the high temperatures (80°–130° C.) of the products etherified by the slurry method, viscosities of only at most 117 mPa.s (1% aqueous solution) are obtained. The solubility in water of the products having degrees of substitution of <0.4 is 95% (DS=0.27) or 96.6–98.2% (DS=0.32).

Accordingly, gel- and fiber-free solutions cannot be obtained by this method.

E. A. Plisko et al. (Zh. Prikl. Khim. 50, 2003 [1967]) describe the production of SEC by reaction of alkali cellulose with the sodium salt of 2-chloroethanesulfonic acid in a kneader or in an isopropanol slurry. The products produced in the kneader have degrees of substitution DS of 0.17 to 0.31. Their solubility in water is put at 66.71 to 93.48%. The products produced by the slurry method have degrees of substitution of 0.35 to 0.42. The solubility in water of the products having a degree of substitution <0.4 is between 91.8 and 92.3%. The products having degrees of substitution of 0.4 and 0.42 have solubilities in water of 97.2 and 99.2%, respectively, so that they are not completely fiber- and gel-free.

DE-OS 3 742 104 describes a process for the production of a sulfoethyl cellulose of excellent solution quality and its reaction with reagents typically encountered in cellulose chemistry, such as for example chloroacetic acid, ethylene oxide, propylene oxide, methyl or ethyl chloride. The viscosity of the solutions is said to be between 15,000 and 60,000 mPa.s. However, the average degree of sulfoethyl substitution (DS) is in the range from 0.4 to 1.4, i.e. is in a range in which very good solubility in water already exists.

U.S. Pat. No. 3,357,971 describes a process for the production of mixed, cold-water-soluble, ionic thermoplastic cellulose mixed ethers. In this case, the nonionic substituent is the hydroxypropyl group. Carboxy, dialkylamino and sulfoalkylation or sulfation groups function as second substituents.

The molar degree of substitution (MS) in regard to hydroxypropyl is said to be >2 but especially 4 or 4.5. The average degree of substitution of the ionic substituent is between 0.001 and 0.4. The hydroxypropyl sulfoethyl cellulose derivatives (HPSEC) mentioned by way of example are readily soluble in cold water, but by virtue of their low degree of sulfoethyl substitution (DS=0.03 or 0.008) still have thermal flocculation points which can be of particular advantage so far as their purification (by washing with hot water) is concerned. The quality of the solutions is not mentioned. However, the described compounds are derivatives which have a molecular degree of substitution in regard to hydroxypropyl of approximately 4. It is known from the literature (K. Engelskirchen in Houben-Weyl's "Makromolekulare Stoffe", Vol. E 20/III, pages 2070, edited by A. Barth and J. Falbe, Georg-Thieme-Verlag, Stuttgart/New York [1987]) that hydroxypropyl celluloses alone show very good solubility in water beyond a molecular degree of substitution of approximately 4. Under the particular reaction conditions applied (16 hours' reaction, working up in an acidic medium), the viscosity of the solutions of the hydroxypropyl sulfoethyl cellulose derivatives mentioned in the Examples is only 570 or 2,000 [mPa.s] (2% by weight aqueous solution, shear rate $D = 2.5 \, s^{-1}$ at 20° C.).

The water-soluble cellulose mixed ethers described in EP-A 0 161 607, EP-A 0 126 959, EP-A 0 080 678 and DE-A 3 306 621 are inter alia ionic hydroxyalkyl cellulose mixed ethers containing carboxyalkyl, sulfonoalkyl, phosphonoalkyl and N,N-dialkylaminoalkyl groups. The products, of which the viscosity, degree of substitution, yield and solution quality are not discussed, are produced either in dimethyl ether or dimethoxyethane alone or in admixture with alkanols, alkanediols and/or alkoxyalkanols.

The problem addressed by the present invention was to provide water-soluble, sulfoethylated cellulose derivatives, more particularly MSEC, which would satisfy certain requirements. An economical and industrially workable process for the production of cellulose ethers presupposes a minimal input of etherifying agent in addition to a high yield of reagent. With these requirements in mind, the invention set out to produce methyl sulfoethyl celluloses characterized by excellent solution quality and a minimal input of etherifying agents. It has now surprisingly been found that the methyl sulfoethyl celluloses produced by the process according to the invention show excellent solubility in water even with degrees of substitution at which the pure cellulose ethers (SEC or MC) are still insoluble in water or have a high fiber and gel content.

Sulfoethyl celluloses are soluble in water beyond an average degree of substitution of >0.3. Methyl celluloses having a DS value (average degree of substitution) of 1.4 to 2.0 are soluble in water, cf. the Chapter entitled "Cellulose Ethers" in Ullmann's Encyclopedia of Industrial Chemistry, Vol. A 5, pages 468 and 480 (Verlag Chemie, Weinheim, [1986]).

The present invention relates to a process for the production of water-soluble, anionic cellulose mixed ethers, more particularly methyl sulfoethyl cellulose (MSEC), having an average degree of substitution (DS) by sulfoethyl of <0.4 and, more particularly <0.35, an average degree of substitution (DS) by methyl of <2.5 and, more particularly, <1.4, a viscosity of 5 to 80,000 mPa.s and, more particularly, in the range from 100 to 50,000 mPa.s (as measured in a 2% by weight aqueous solution at a shear rate D of 2.5 s$^{-1}$ at 20° C.) and a transmission (as measured on a 2% by weight aqueous solution in a cuvette having an optical path length of 10 mm with light having a wavelength λ of 550 nm) of more than 95% and, more particularly, more than 96%. It is also possible by the process according to the invention to produce cellulose mixed ethers in degrees of substitution (for example HPSEC) at which the simple cellulose ethers (for example HPC or SEC) are insoluble or only sparingly soluble in water.

A particular criterion of the MSEC produced in accordance with the invention is its excellent solution quality. Gel particles and fibers are formed through non-etherified or only partly etherified cellulose zones. The high solubility of cellulose ethers in water is determined not only by their average degree of polymerization (DP) and their degree of substitution, but also by the homogeneous, i.e. uniform, distribution of the substituents along the cellulose chain. This regular distribution of the substituents is largely dependent on the alkalization of which the function is to loosen up the microfibrillar structure of the cellulose fibers and to reduce their state of order to establish good accessibility for the reagents.

The gel- and fiber-free cellulose derivatives produced by the process according to the invention and characterized by the measuring process described hereinafter are used as thickeners, dispersants or binders, particularly for applications requiring excellent solution qualities, as for example in the paper, oil and textile industries and in the cosmetic and pharmaceutical industries. The products may be used in the building industry, for example as tile adhesives, as dispersants and suspending agents in emulsion and suspension polymerizations and as thickeners and stabilizers in surfactant-containing systems, for example detergents, and also for emulsion paints.

The process according to the invention for the production of water-soluble methyl sulfoethyl cellulose derivatives (MSEC) is preferably carried out in a cylindrical reaction vessel equipped with a suitable stirrer to provide for adequate mixing of the heterogeneous reaction mixture. The reaction vessel is preferably closed to enable the reaction to be carried out in a nitrogen atmosphere. The reaction vessel is also preferably provided with adequate heating means.

The process for the production of the products according to the invention is characterized in that 1. the alkali cellulose is preferably prepared in an inert organic solvent by reaction of cellulose with alkali, 2. the etherification of the alkali cellulose is carried out in the presence of a base using at least one etherifying agent (sulfoalkylating agent and/or a compound which transfers alkyl groups) requiring an at least catalytic quantity of a base, 3. further etherification is optionally carried out using at least one etherifying agent (a compound transferring alkyl groups and/or a sulfoalkylating agent), optionally in an inert organic solvent or, where the gas method is used, without any solvent, 4. the product obtained after etherification is optionally neutralized, filtered and washed.

Any of the substituents typically encountered in cellulose chemistry may be used for the etherification, more particularly compounds which transfer methyl groups, such as dimethyl sulfate, methyl bromide, methyl iodide, methanesulfonic acid methyl ester, benzyl-4-sulfonic acid methyl ester, toluene-4-sulfonic acid methyl ester, trifluoromethanesulfonic acid methyl ester, but preferably methyl chloride. Preferred sulfoalkyl-transferring compounds are chloroethanesulfonic acid, bromoethanesulfonic acid, vinylsulfonic acid and salts thereof, more particularly salts of vinylsulfonic acid, especially the sodium salts.

Ground celluloses, particularly linters, softwood sulfite, softwood sulfate or hardwood pulps, are used as starting material for the process according to the invention. The methyl sulfoethyl celluloses according to the invention are distinguished by complete solubility in water, i.e. the products have a soluble component of >99.5% and, more particularly, >99.8%, as measured by the method described hereinafter.

The MSEC is preferably produced by a one-pot process, i.e. alkalization and etherification are carried out in one and the same unit. The MSEC may also be produced by a two-stage process, in the first stage of which a sulfoethyl cellulose (SEC) is produced, preferably in an inert organic solvent, and is subsequently further etherified with methyl chloride, preferably by the methyl chloride slurry method or by the gas circulation method. The MSEC may also be produced by a two-stage process in which alkalization and etherification with methyl chloride are carried out in the first stage in a closed reaction vessel either in a nitrogen atmosphere or in the absence of pressure by the gas circulation method. The subsequent etherification with the sulfoalkylating agent, preferably the sodium salt of vinyl sulfonic acid, is preferably carried out in a closed reaction vessel in a nitrogen atmosphere, preferably in an inert organic solvent.

The viscosity stages of the products may be adjusted by the exclusion or addition of oxidizing substances, such as for example air, $H_2O_2$ and/or metal oxides, and the choice of the celluloses used which have different average degrees of polymerization. The cellulose may be alkalized in the absence or, where an extremely low fiber content is required, in the presence of organic solvents. The alkalization is generally carried out with an alkali metal hydroxide, more particularly sodium hydroxide. The sodium hydroxide is used in a quantity of 0.5 to 5.0 mol and, more particularly, 3 mol per mol cellulose.

To obtain fiber- and gel-free water-soluble products, alkalization and etherification of the cellulose may be carried out in the presence of organic solvents. The suspension medium used is selected from cyclic and/or acyclic ethers, aromatic and/or aliphatic hydrocarbons either on their own or in combination with aliphatic alcohols or ketones, nitrogen- or sulfur-containing solvents, such as for example dimethylamide or dimethylsulfoxide, either on their own or in conjunction with formaldehyde or alkali metal or alkaline earth metal salts, lower alcohols preferably containing 2 to 5 carbon atoms per molecule, ketones and mixtures of these solvents. Isopropanol and 2-methylpropan-2-ol or mixtures thereof are particularly suitable for use as solvents in the process according to the invention.

Alkalization of the cellulose is preferably carried out with sodium hydroxide having a concentration of 18 to 100% by weight. According to the invention, the etherification reagents are added either before the sodium hydroxide or after the alkalization phase. For etherification, the reaction mixture is heated to temperatures of 50° to 100° C. and preferably to temperatures of 60° to 90° C. and the temperature level established is maintained until the reaction is complete. The etherification times are between 1 and 15 h, depending on the temperatures and the suspension medium.

The product obtained by the process according to the invention is optionally neutralized and optionally separated from the slurry medium (by centrifugation or filtration) and optionally freed from adhering salts by washing with alcohols, alcohol/water mixtures, ketones or ketone/water mixtures. Where etherification is carried out in two stages, purification may be carried out after the first stage using aqueous organic solvents, hot or cold water. Since the simple cellulose ethers (SEC and MC) are optionally water-insoluble products, they may optionally be purified with cold water. It is also possible to omit the neutralization step, to remove any excess alkali by washing with suitable aqueous organic solvent mixtures or to leave the quantities of salt in the product after neutralization, if any, and hence to omit the purification step. Any purification of the MSEC is largely dependent upon its intended application. If the purpose for which the MSEC is to be used necessitates removal of the salts formed by washing out, purification may be carried out with aqueous organic solvents and preferably with 70 to 100% methanol or acetone.

EXAMPLES

In the Examples, parts are parts by weight.

The viscosities are measured with a Haake type RV 100, System M 500, rotational viscosimeter (measuring arrangement MV) in accordance with DIN 53 019 at a shear rate D of 2.5 $s^{-1}$ and at a temperature of 20° C. 2% by weight solutions in distilled water are used for the viscosity measurements. The transmission measurements are carried out with a Hitachi model 101 spectral photometer (Hitachi Ltd., Tokyo, Japan). A glass cuvette having an optical path length of 10 mm was used. The wavelength $\lambda$ used was 550 nm. 2% by weight solutions in distilled water were used for the transmission measurements. To determine solubility in water, the air-dry, purified cellulose ether is weighed into the measuring vessel in a quantity corresponding to 2,000 mg bone-dry substance and dissolved in 198 ml distilled water. The solution is then completely filtered off under suction through a weighed glass filter crucible G 2 dried to constant weight at 120° C. The filter crucible is then washed 5 times with 100 ml distilled water to remove any adhering dissolved cellulose ether. The glass filter crucible is then redried to constant weight at 120° C. and reweighed. The difference between the two weights represents the insoluble component from which the percentage of soluble cellulose ether can be calculated. Within the limits of error, cellulose ethers having a water-soluble component of more than 99.5% and, more particularly, 99.8% are rated as completely soluble.

With the cellulose ethers according to the invention, the abbreviations DS and MS have the usual meanings, namely average degree of substitution and molar degree of substitution.

Each anhydroglucose unit of the cellulose contains three hydroxyl groups.

DS: Average number of hydroxyl groups substituted in the cellulose per anhydroglucose unit.

MS: Average number of mols of reactants combined with the cellulose per anhydroglucose unit.

EXAMPLE 1

68.6 g of a finely ground spruce sulfite pulp (dry matter content: 94.5%) are introduced into a pressure reactor equipped with a wall-sweeping blade stirrer. After the introduction of 1,370 ml tertiary butanol and 11.9 ml water, the reactor is purged with nitrogen and its contents are thoroughly mixed for 15 minutes. 62.9 ml of a 50% by weight sodium hydroxide solution are then sprayed on, followed by alkalization for 80 minutes at 25° to 30° C. After the addition of 133 ml methyl chloride, the contents of the reactor are heated to 74° C. over a period of 60 minutes. This temperature is maintained for 30 minutes with continuous stirring. 89.5 ml of a 44.1% by weight aqueous vinylsulfonic acid sodium salt solution are then sprayed on and the mixture is intensively mixed for another 210 minutes at 74° C. The product is filtered off and washed four times with 2,000 parts methanol and once with 2,000 parts ethanol. The product data are shown in Table 1.

EXAMPLE 2

68.9 g of a finely ground spruce sulfite pulp (dry matter content: 94.19%) are introduced into a pressure reactor equipped with a wall-sweeping blade stirrer. After the introduction of 1,370 ml tertiary butanol and 103.6 g of a 25.1% by weight vinylsulfonic acid sodium salt solution, the reactor is purged with nitrogen. 133 ml methyl chloride and 62.9 ml of a 50% by weight sodium hydroxide solution are then sprayed on, followed by alkalization for 80 minutes at 25° to 30° C., the reaction mixture being thoroughly mixed. The contents of the reactor are then heated to 74° C. over a period of 60 minutes. This temperature is then maintained for 180 minutes with continuous stirring. The product is filtered off, washed four times with 2,000 parts methanol and once with 2,000 parts ethanol and then dried in air. The product data are shown in Table 1.

EXAMPLE 3

68.6 g of a finely ground spruce sulfite pulp (dry matter content: 94.5%) are suspended in 1,370 ml tertiary butanol in a pressure reactor equipped with a wall-sweeping blade stirrer. 54.1 g of a 48.1% by weight aqueous vinylsulfonic acid sodium salt solution are then added and the reactor is purged with nitrogen. The mixture is then thoroughly stirred for 15 minutes. 145.7 g of a 32.9% by weight sodium hydroxide solution and 133 ml methyl chloride are then sprayed on, followed by alkalization for 80 minutes at 25° to 30° C. The contents of the reactor are then heated to 74° C. over a period of 60 minutes and kept at that temperature for 180 minutes. The product is filtered off, washed four times with 2,000 parts methanol and once with 2,000 parts ethanol and dried in air. The product data are shown in Table 1.

EXAMPLE 4

258.22 g of a finely ground spruce sulfite pulp (dry matter content: 96.02%) are suspended in 3,630 ml isopropanol in a pressure reactor equipped with a wall-sweeping stirrer. 693.2 g of a 28.15% by weight aqueous vinylsulfonic acid sodium salt solution are then added and the reactor is purged with nitrogen. 180 g sodium hydroxide are then added through an inverted bottle in a counter-current of nitrogen, followed by alkalization for 80 minutes at 25° to 30° C., the reaction mixture being thoroughly stirred. 997.8 ml methyl chloride are then sprayed on and the contents of the reactor are heated to 70° C. over a period of 60 minutes. This temperature is maintained for 180 minutes with continuous stirring. The product is filtered off and washed six times with 2,000 parts of a mixture of eight parts acetone and two parts water. The product is dried in air. The product data are shown in Table 1.

EXAMPLE 5

68.6 g of a finely ground spruce sulfite pulp (dry matter content: 94.5%) are suspended in 1,370 ml tertiary butanol in a pressure reactor equipped with a wall-sweeping blade stirrer. After addition of 103.9 g of a 25.0% by weight vinylsulfonic acid sodium salt solution, the reactor is purged with nitrogen and the mixture is vigorously stirred for 15 minutes. 62.9 ml of a 50% by weight sodium hydroxide solution and 133 ml methyl chloride are then sprayed on. After alkalization for 80 minutes at 25° to 30° C., the contents of the reactor are heated to 74° C. over a period of 60 minutes. This temperature is maintained for 180 minutes. The product is filtered off, washed four times with 2,000 parts methanol and once with 2,000 parts ethanol and then dried in air. The product data are shown in Table 1.

EXAMPLE 6

68.6 g of a finely ground spruce sulfite pulp (dry matter content: 94.5%) are suspended in 1,370 ml tertiary butanol in a pressure reactor equipped with a wall-sweeping blade stirrer. The reactor is purged with nitrogen. 46.4 ml of a 46.3% by weight sodium hydroxide solution are sprayed on with stirring. The mixture is alkalized for 80 minutes at 25° to 30° C. and, after 133 ml methyl chloride have been sprayed on, is heated to 74.C over a period of 60 minutes. This temperature is maintained for 30 minutes. 122.4 ml of a 45.1% by weight aqueous vinylsulfonic acid sodium salt solution are then sprayed on. The mixture is then stirred for 210 minutes at 74° C. The product is filtered off, washed three times with 2,000 parts methanol and twice with 2,000 parts ethanol and dried in air. The product data are shown in Table 1.

EXAMPLE 7

64.9 g of a finely ground spruce sulfite pulp (dry matter content: 94.5%) are suspended in 1,370 ml tertiary butanol in a pressure reactor equipped with a wall-sweeping blade stirrer. The reactor is purged with nitrogen. 138.8 g of a 43.58% by weight sodium hydroxide solution are sprayed on with stirring. The mixture is alkalized for 80 minutes at 25° to 30° C., after which 46.7 ml of a 42.6% by weight aqueous vinylsulfonic acid sodium salt solution are sprayed on with stirring. The mixture is heated to 74° C. over a period of 60 minutes and is intensively stirred at that temperature for 60 minutes. 133 ml methyl chloride are sprayed on with stirring at 74° C. The mixture is stirred for 180 minutes at 74° C. The product is filtered off, washed four times with 2,000 parts methanol and once with 2,000 parts ethanol and dried in air. The product data are shown in Table 1.

COMPARISON EXAMPLES 8 and 9

COMPARISON EXAMPLE 8

Production of a methyl sulfoethyl cellulose (MSEC) in a kneader (US-PS 2,132,181)

255.1 g of a finely ground linters pulp (dry matter content: 95.32%) are suspended in 600 ml tertiary butanol in a pressure reactor equipped with a wall-sweeping blade stirrer and the reactor is purged with nitrogen. 63 ml of a 50% by weight sodium hydroxide solution are then sprayed on with stirring. After addition of 194 ml methyl chloride, the mixture is alkalized for 60 minutes at 25°-30° C. The mixture is then heated to 80° C. over a period of 60 minutes and is kept at that temperature for 120 minutes. The product is filtered off and washed with hot water until free from chloride. 677 g of the moist methyl cellulose are introduced into a kneader and mixed therein with 675 g sodium hydroxide and 363 g water for 120 minutes at 25° C. 1,470 g of a 30% by weight aqueous vinylsulfonic acid sodium salt solution are then sprayed on, followed by mixing for 3 h at 25° C. The mixture is heated to 65° C. over a period of 15 minutes and is then thoroughly mixed for 180 minutes at 65° to 70° C. The product is filtered off, washed four times with 2,000 parts of a mixture of eight parts methanol and two parts water and then dried in air. The product data are shown in Table 1.

COMPARISON EXAMPLE 9

Production of a methyl sulfoethyl cellulose (MSEC) from a sulfoethyl cellulose (SEC) (DE-OS 3 742 104)

127 g cotton linters (dry matter content: 95.81%) are suspended in 2,190 g isopropanol in a cylindrical reaction vessel which is equipped with a suitable stirrer and can be suitably temperature-controlled and filled with nitrogen. 333.5 g of a 42.7% by weight solution of the sodium salt of vinylsulfonic acid are then added. 28 ml water and 75.5 g sodium hydroxide are then introduced, followed by alkalization for 80 minutes at 25° to 30° C. The mixture is then heated to 75° C. over a period of 60 minutes and kept at that temperature for 180 minutes. The reaction mixture is neutralized by addition of an equimolar quantity of concentrated acetic acid and the product is filtered off. The product is washed five times with 2,000 parts of a mixture of 7 parts methanol and 3 parts water and is then dried in air. 173 g (dry matter content: 87.97%) of the product are introduced into a pressure reactor equipped with a wall-sweeping blade stirrer, after which the reactor is purged with nitrogen. 29 g sodium hydroxide are dissolved in 29 g water and the solution is sprayed on with continuous stirring. The mixture is stirred for 80 minutes at 25° to 30° C. 121 g methyl chloride are sprayed on. The mixture is then heated to 75° C. over a period of 60 minutes and is then continuously stirred for 30 minutes at that temperature. The product is filtered off, washed four times with 2,000 parts of a mixture of eight parts methanol and two parts water and dried in air. The product data are shown in Table 1.

EXAMPLE 10

Production of a hydroxypropyl sulfoethyl cellulose (HPSEC)

87.1 g of a finely ground spruce sulfite pulp (dry matter content: 86.7%) are suspended in 1,066 g tertiary butanol in a pressure reactor equipped with a wall-sweeping blade stirrer and the reactor is purged with nitrogen. 13.2 g of a 49.5% by weight aqueous vinylsulfonic acid sodium salt solution are then added, after which 101 g water and 59.9 g of a 50.1% by weight sodium hydroxide solution are sprayed on. After addition of 174.2 g propylene oxide, the mixture is alkalized for 80 minutes at 25° to 30° C. The mixture is then heated to 90° C. over a period of 60 minutes and kept at that temperature for 120 minutes. It is then neutralized with an equimolar quantity of concentrated acetic acid. The product is filtered off, washed three times with 2,000 parts of a mixture of eight parts acetone and two parts water and then with 2,000 parts acetone and dried in air. The product data are shown in Table 2.

EXAMPLE 11

Production of an ethyl sulfoethyl cellulose (ESEC)

68.8 g of a finely ground spruce sulfite pulp (dry matter content: 94.5%) are suspended in 1,370 ml tertiary butanol in a pressure reactor equipped with a wall-sweeping blade stirrer. After addition of 101.8 g of a 51.1% by weight aqueous vinylsulfonic acid sodium salt solution, the reactor is purged with nitrogen. 87.4 ml of a 38.7% by weight sodium hydroxide solution are sprayed on with stirring and the mixture is alkalized for 80 minutes at 25° to 30° C. 168 ml ethyl chloride are then sprayed on with stirring. The mixture is heated to 95° C. over a period of 60 minutes and kept at that temperature for 300 minutes. The product is filtered off, washed three times with 2,000 parts of a mixture of seven parts methanol and three parts water and then twice with 2,000 parts ethanol. The product data are shown in Table 2.

The cellulose ethers of Examples 1 to 7, 10 and 11 synthesized by the process according to the invention all have transmission values well above 95%, which is also reflected in the high to very high absence of gel and fibers in the products.

Comparison Examples 8 and 9 show that, due to the process, only low viscosities can be obtained (Example 8), the transmission values still remaining distinctly behind those of the cellulose derivatives synthesized by the process according to the invention, even for a degree of sulfoethyl substitution of well above 0.3.

Example 9 shows that the excellent solubility of the products according to the invention in water can also be achieved when the degree of sulfoethyl substitution is well above 0.3. However, this is neither economical nor surprising because the pure sulfoethyl cellulose shows excellent solubility in water beyond a degree of substitution of about 0.5 (E. A. Plisko et al., Zh. Prikl. Khim. 36, 1994 [1963]; K. Engelskirchen in Houben-Weyl's "Makromolekulare Stoffe", Vol. E 20/III, page 2083, edited by A. Barth and J. Falbe, Georg-Thieme Verlag, Stuttgart/New York [1987]).

TABLE 1

Product data of Examples 1 to 9

| Example No. | Dry matter content [%] | Viscosity [mPa·s] | DS sulfo-ethyl | DS methyl | Chemical yield based on VSSNa [%] | Chemical yield based on MeCl [%] | Transmission [%] | Water-soluble component [%] |
|---|---|---|---|---|---|---|---|---|
| 1 | 90.2 | 717 | 0.27 | 1.21 | 27 | 40 | 97.9 | 100 |
| 2 | 83.8 | 2,150 | 0.28 | 1.39 | 56 | 46 | 97.5 | 99.98 |
| 3 | 88.2 | 5,017 | 0.29 | 1.17 | 58 | 39 | 98.1 | 99.98 |
| 4 | 96.0 | 4,491 | 0.31 | 1.31 | 31 | 44 | 97.9 | 99.96 |
| 5 | 88.0 | 6,737 | 0.31 | 1.08 | 62 | 36 | 97.9 | 99.85 |
| 6 | 88.5 | 8,922 | 0.32 | 0.97 | 23 | 48 | 97.7 | 99.98 |
| 7 | 87.7 | 5,972 | 0.32 | 1.08 | 64 | 36 | 98.0 | 99.96 |
| 8* | 95.8 | 48 | 0.69 | 0.47 | 32 | 78 | 69.3 | 90.78 |
| 9** | 88.9 | 15,100 | 0.70 | 0.87 | 50 | 82 | 96.7 | 99.98 |

*Comparison US-PS 2,132,181
**Comparison DE-OS 3 742 104

Dry matter content: Crude product (air dry) less moisture, expressed in percent

Viscosity: 2% by weight in distilled water, expressed in mPa.s

DS: Degree of substitution, number of substituents per anhydroglucose unit

Chemical yield VSSNa: Quantity of alkylating agent reacted to the product, expressed in percent of the vinylsulfonic acid sodium salt (VSSNa) used Chemical yield MeCl: Quantity of alkylating agent reacted to the product, expressed in percent of the base used (NaOH)

Transmission: Percentage of incident light transmitted on passing through a cuvette filled with a 2% cellulose ether solution. Optical path length of cuvette: 10 [mm], wavelength λ used: 550 [nm]

TABLE 2

| | | | | | Chemical yield based on | | | | Water- |
|---|---|---|---|---|---|---|---|---|---|
| | Dry matter | | DS | MS | | | | Trans- | soluble |
| Example No. | content [%] | Viscosity [mPa·s] | sulfo- ethyl | DS ethyl | hydroxy- propyl | VSSNa [%] | EtCl [%] | PO [%] | mission [%] | component [%] |
| 10 | 86.7 | 5,700 | 0.05 | — | 1.6 | 50 | — | 27 | 97.9 | 99.98 |
| 11 | 85.6 | 109 | 0.21 | 0.66 | — | 21 | 22 | — | 96 | 99.96 |

Dry matter content: Crude product (air dry) less moisture, expressed in percent

Viscosity: 2% by weight in distilled water, expressed in mPa.s

DS: Degree of substitution, number of substituents per anhydroglucose unit

MS: Molar degree of substitution, number of substituent units per anhydroglucose unit Chemical yield PO: Quantity of alkylating agent reacted to the product, expressed in percent of the vinylsulfonic acid sodium salt (VSSNa) or propylene oxide (PO) used Chemical yield EtCl: Quantity of alkylating agent reacted to the product, expressed in percent of the base used (NaOH)

Transmission: Percentage of incident light transmitted on passing through a cuvette filled with a 2% cellulose ether solution. Optical path length of cuvette: 10 [mm], wavelength λ used: 550 [nm]

We claim:

1. Methyl or ethyl sulfoethyl cellulose having a DS sulfoethyl of about 0.21 to 0.4, a DS methyl or ethyl of about 0.66 to 2.5, a viscosity of 5 to 60,000 mPa.s (as measured in 2% by weight aqueous solution at a shear rate D of 2.5 s$^{-1}$ at 20° C.), and having a transmission (as measured on a 2% by weight aqueous solution in a cell having an optical path length of 10 mm with light having a wavelength of λ=550 nm) of more than 95%.

2. Methyl or ethyl sulfoethyl cellulose according to claim 1, having a DS sulfoethyl of <0.35 and a DS methyl or ethyl of <1.4.

3. Methyl sulfoethyl cellulose according to claim 1, having a DS sulfoethyl of <0.34, a DS methyl of <1.4 and a transmission of more than 96%.

* * * * *

UNITED STATES PATENT AND TRADEMARK OFFICE
CERTIFICATE OF CORRECTION

PATENT NO. : 5,278,304
DATED : January 11, 1994
INVENTOR(S) : Kniewske, et al.

It is certified that error appears in the above-indentified patent and that said Letters Patent is hereby corrected as shown below:

Col. 12, line 26   Delete " $\leq 0.34$ " and substitute -- $\leq 0.35$ --

Signed and Sealed this

First Day of September, 1998

Attest:

BRUCE LEHMAN

Attesting Officer

Commissioner of Patents and Trademarks